United States Patent
Oldani et al.

(10) Patent No.: US 10,005,342 B1
(45) Date of Patent: Jun. 26, 2018

(54) REMOVABLE VEHICLE WINDOWPANE ASSEMBLY

(71) Applicant: Ford Global Technologies, LLC, Dearborn, MI (US)

(72) Inventors: Raymond Anthony Oldani, Canton, MI (US); Paul L. Heirtzler, Jr., Northville, MI (US); Donald P. Iacovoni, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/459,681

(22) Filed: Mar. 15, 2017

(51) Int. Cl.
*B60J 5/04* (2006.01)
*E05D 15/16* (2006.01)
*E05D 7/10* (2006.01)
*B60J 1/17* (2006.01)
*B60J 7/12* (2006.01)

(52) U.S. Cl.
CPC ............. *B60J 5/0487* (2013.01); *B60J 1/17* (2013.01); *B60J 7/1226* (2013.01); *E05D 7/10* (2013.01); *E05D 15/165* (2013.01)

(58) Field of Classification Search
CPC . B60J 5/0487; B60J 1/17; B60J 7/1226; B60J 10/70; E05D 7/10; E05D 15/165
USPC ........................................... 296/146.2, 146.3
See application file for complete search history.

(56) References Cited

U.S. PATENT DOCUMENTS

| | | | | |
|---|---|---|---|---|
| 2,567,153 A | * | 9/1951 | Jackson | B60J 1/08 49/166 |
| 4,644,699 A | * | 2/1987 | Chandler | B60J 5/0487 296/146.2 |
| 4,796,943 A | | 10/1989 | Fukutomi et al. | |
| 5,685,596 A | | 11/1997 | Tokarz et al. | |
| 6,036,255 A | * | 3/2000 | Lester | B60J 5/0416 296/146.1 |
| 6,247,746 B1 | * | 6/2001 | Brush | B60J 5/0487 296/146.11 |

(Continued)

FOREIGN PATENT DOCUMENTS

| | | |
|---|---|---|
| KR | 100188593 B1 | 6/1999 |
| WO | 2011014684 A1 | 2/2011 |

*Primary Examiner* — Joseph D. Pape
(74) *Attorney, Agent, or Firm* — Jason Rogers; Price Heneveld LLP

(57) ABSTRACT

A vehicle comprising: a removable windowpane assembly comprising an unretractable windowpane and a door-attachment projection attached to the unretractable windowpane; a frameless passenger door comprising: an exterior panel and an interior panel forming a chamber and defining a beltline and a receiver located within the chamber with a top surface adjacent the beltline to receive the door-attachment projection attached to the unretractable windowpane; a retractable windowpane; the retractable windowpane movable between a down position where the retractable windowpane is completely housed in the chamber below the beltline and an up position where the retractable windowpane is partially housed in the chamber and partially extending above the beltline; and the removable windowpane assembly having an attached position and a detached position, wherein in the attached position the receiver has received the door-attachment projection, and wherein in the detached position the receiver is not receiving the door-attachment projection.

16 Claims, 8 Drawing Sheets

(56) References Cited

U.S. PATENT DOCUMENTS

| | | |
|---|---|---|
| 6,827,391 B1 | 12/2004 | Kohn et al. |
| 6,866,322 B2 | 3/2005 | Willard |
| 9,114,690 B1 | 8/2015 | Bowles et al. |
| 2006/0163913 A1 | 7/2006 | Gammon et al. |
| 2010/0156138 A1* | 6/2010 | Terai ........................ B60J 1/007 296/146.3 |
| 2011/0233959 A1 | 9/2011 | Cover et al. |
| 2012/0133174 A1 | 5/2012 | Syvret et al. |

* cited by examiner

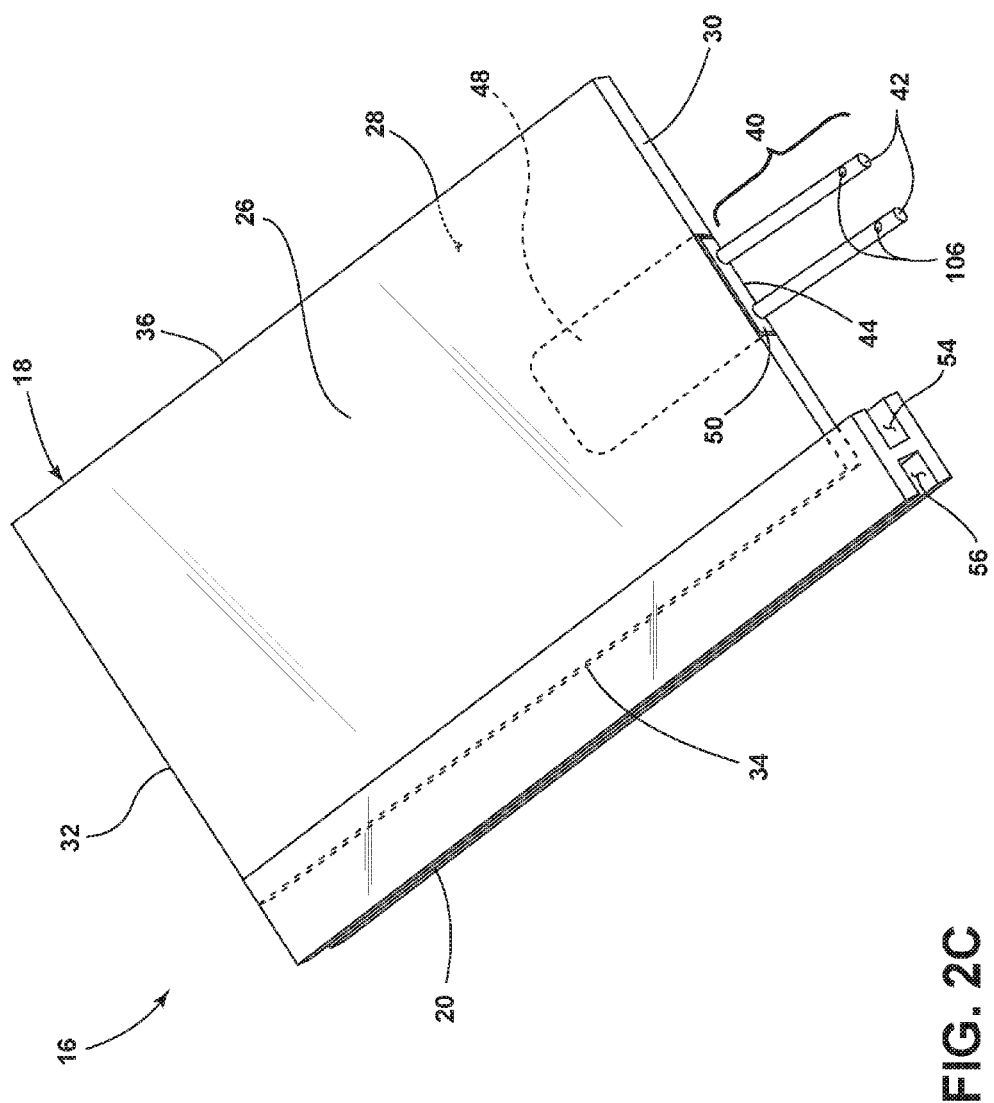

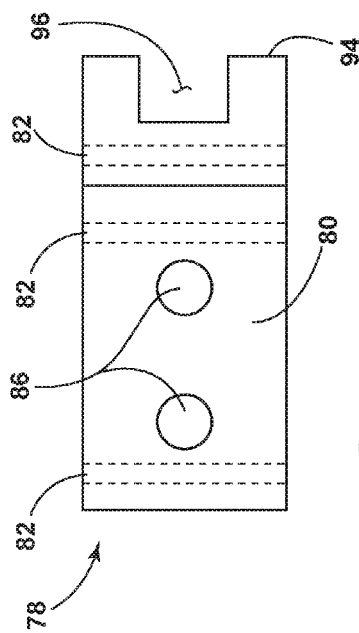
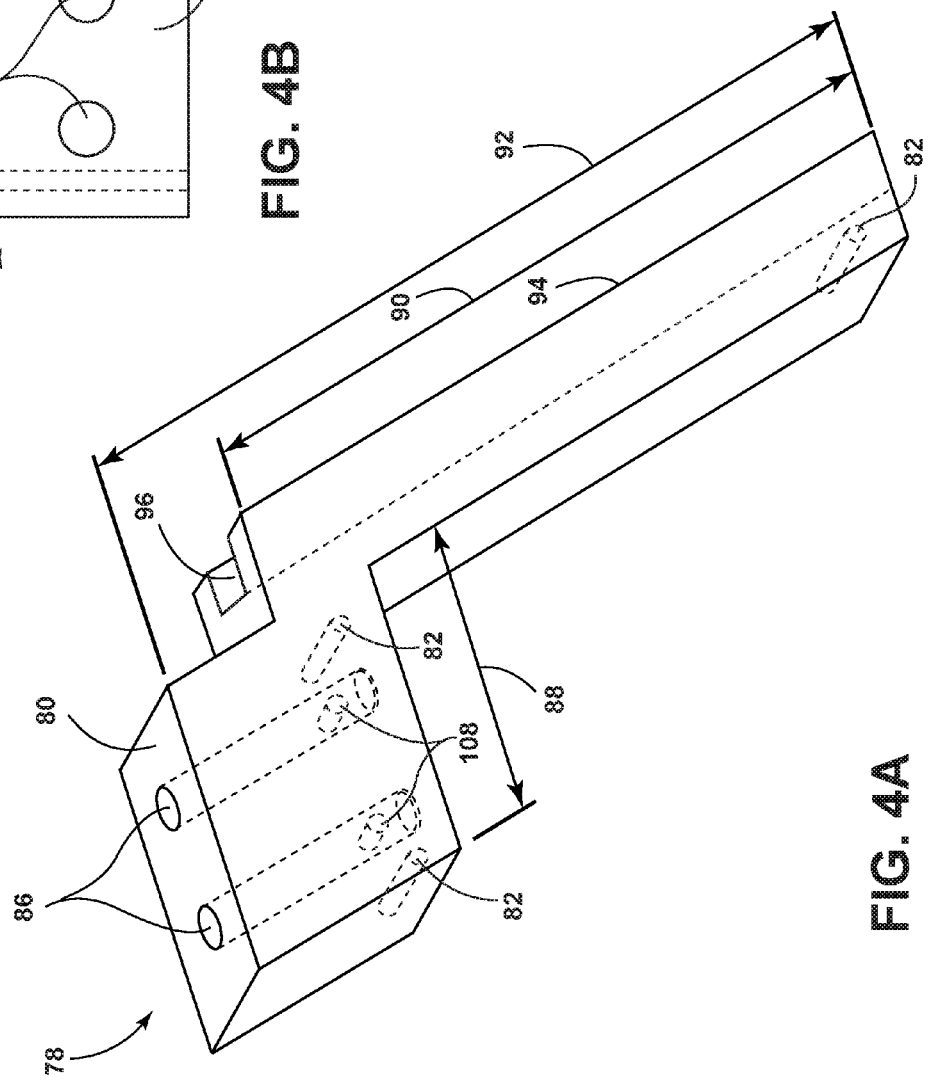
FIG. 4B
FIG. 4A

REMOVABLE VEHICLE WINDOWPANE ASSEMBLY

FIELD OF THE INVENTION

The present invention generally relates to vehicles with frameless passenger doors, including vehicles with a convertible roof and removable frameless passenger doors.

BACKGROUND OF THE INVENTION

Some passenger door windowpanes are not easily retractable into the interior of the passenger door. The inability to retract a windowpane into the interior of the door is disadvantageous when the door does not frame the windowpane (called a "frameless door") and the vehicle has a convertible roof. In addition, the inability to retract a windowpane into the interior of a frameless door is disadvantageous when the frameless door is removable from the vehicle frame.

SUMMARY OF THE INVENTION

According to a first aspect of the present invention, a removable windowpane assembly for a vehicle comprises: an unretractable windowpane; and a door-attachment projection attached to the unretractable windowpane.

Embodiments of the first aspect of the invention can include any one or a combination of the following features:
- a division bar attached to the unretractable windowpane;
- the unretractable windowpane comprising a bottom side, wherein the door-attachment projection extends from the bottom side;
- the unretractable windowpane comprising a divider side, wherein the division bar is attached to the divider side;
- the door-attachment projection comprising at least two arms;
- the division bar extends beyond the bottom side of the unretractable windowpane; and
- the unretractable windowpane comprising a bottom side, the door-attachment projection comprising at least two arms extending from the bottom side, and wherein the division bar is parallel to the at least two arms.

According to second aspect of the present invention, a frameless passenger door for a vehicle comprises: an exterior panel and an interior panel forming a chamber and defining a beltline; and a receiver located within the chamber having a top surface adjacent to the beltline to receive a door-attachment projection attached to an unretractable windowpane.

Embodiments of the second aspect of the invention can include any one or a combination of the following features:
- the frameless passenger further comprising a forward end and a rear end, the forward end having a forward height and the rear end having a rear height, wherein the forward height is greater than the rear height, and the receiver is located closer to the rear end than the forward end;
- the receiver comprising at least two holes disposed perpendicular to the beltline;
- the receiver comprising a horizontal portion and a vertical portion, the vertical portion being perpendicular to and longer than the horizontal portion, and at least two holes disposed within the horizontal portion and parallel to the vertical portion; and
- the receiver further comprising a forward facing surface and a channel disposed within the forward facing surface to partially surround a retractable windowpane.

According to third aspect of the present invention, a vehicle comprises: a removable windowpane assembly comprising an unretractable windowpane and a door-attachment projection attached to the unretractable windowpane; a frameless passenger door comprising: an exterior panel and an interior panel forming a chamber and defining a beltline; and a receiver located within the chamber with a top surface adjacent the beltline to receive the door-attachment projection attached to the unretractable windowpane; a retractable windowpane that is larger than the unretractable windowpane; the retractable windowpane movable between a down position where the retractable windowpane is completely housed in the chamber below the beltline and an up position where the retractable windowpane is partially housed in the chamber and partially extending above the beltline; and the removable windowpane assembly having an attached position and a detached position, wherein in the attached position the receiver has received the door-attachment projection and is attached thereto, and wherein in the detached position the receiver is not receiving the door-attachment projection and is not attached thereto.

Embodiments of the third aspect of the invention can include any one or a combination of the following features:
- the removable windowpane assembly further comprising a division bar attached to the unretractable windowpane; wherein when the retractable windowpane is in the up position and the removable windowpane assembly is in the attached position, the division bar is disposed between the unretractable windowpane and the retractable windowpane; and wherein when the removable windowpane assembly is in the attached position, a portion of the division bar is in the chamber;
- the receiver further comprising a forward facing surface and a channel disposed within the forward facing surface, wherein when the retractable windowpane is in the down position, the channel of the receiver partially surrounds the retractable windowpane, and wherein when the retractable windowpane moves between the up position and the down position, the retractable windowpane moves within the channel of the receiver;
- the door-attachment projection comprising at least two arms, the receiver comprising at least two holes, wherein when the removable windowpane assembly is in the attached position, the at least two arms are disposed in the at least two holes, and wherein when the removable windowpane assembly is in the detached position, the at least two arms are not disposed in the at least two holes;
- the at least two arms are parallel to the division bar and the at least two holes are perpendicular to the beltline;
- the frameless passenger door further comprising a forward end and a rear end, the forward end having a forward height and the rear end having a rear height, wherein the forward height is greater than the rear height, and the receiver is located closer to the rear end than the forward end;
- the door-attachment projection comprising at least two arms parallel to the division bar; the receiver comprising a horizontal portion and a vertical portion, which is perpendicular to and longer than the horizontal portion, and at least two holes disposed within the horizontal portion and parallel to the vertical portion; wherein when the removable windowpane assembly is in the attached position, the at least two arms are disposed in the at least two holes, and wherein when the removable windowpane assembly is in the detached position, the at least two arms are not disposed in the at least two holes; and a convertible roof and a door support, wherein the frameless passenger door is releasably attached to the door support.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2C is a perspective view of another embodiment of the removable windowpane;

FIG. 4A is a perspective view of an embodiment of the receiver of FIG. 3 including at least two holes disposed within a horizontal portion and parallel to a vertical portion;

FIG. 4B is a top plan view of an embodiment of the receiver of FIG. 3 including at least two holes disposed within a horizontal portion and parallel to a vertical portion;

DETAILED DESCRIPTION OF THE PREFERRED EMBODIMENTS

Figure 1:
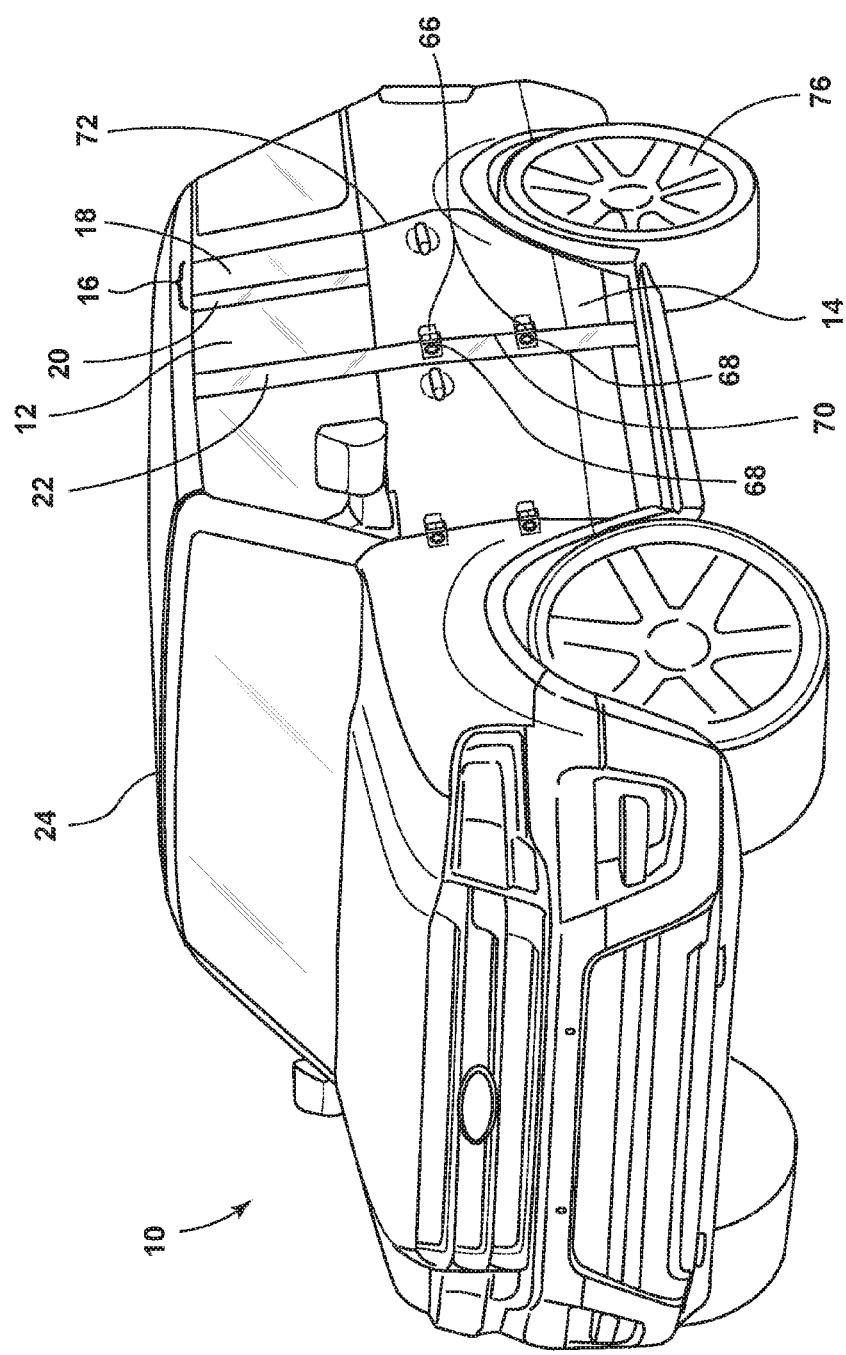
FIG. 1 is a perspective view of an embodiment of a vehicle of the present disclosure illustrating a removable windowpane assembly attached to a frameless passenger door.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 is illustrated including a retractable windowpane 12, a frameless passenger door 14, and a removable windowpane assembly 16, which includes an unretractable windowpane 18 and a division bar 20. The frameless passenger door 14 is frameless—meaning that the passenger door does not have a windowpane framing structure around either the unretractable windowpane 18 or the retractable windowpane 12. The vehicle 10 further includes a door support 22. The frameless passenger door 14 is releasably attached to the door support 22. The vehicle 10 further includes a convertible roof 24. The vehicle 10 can be an off-road vehicle.

Figure 2A:
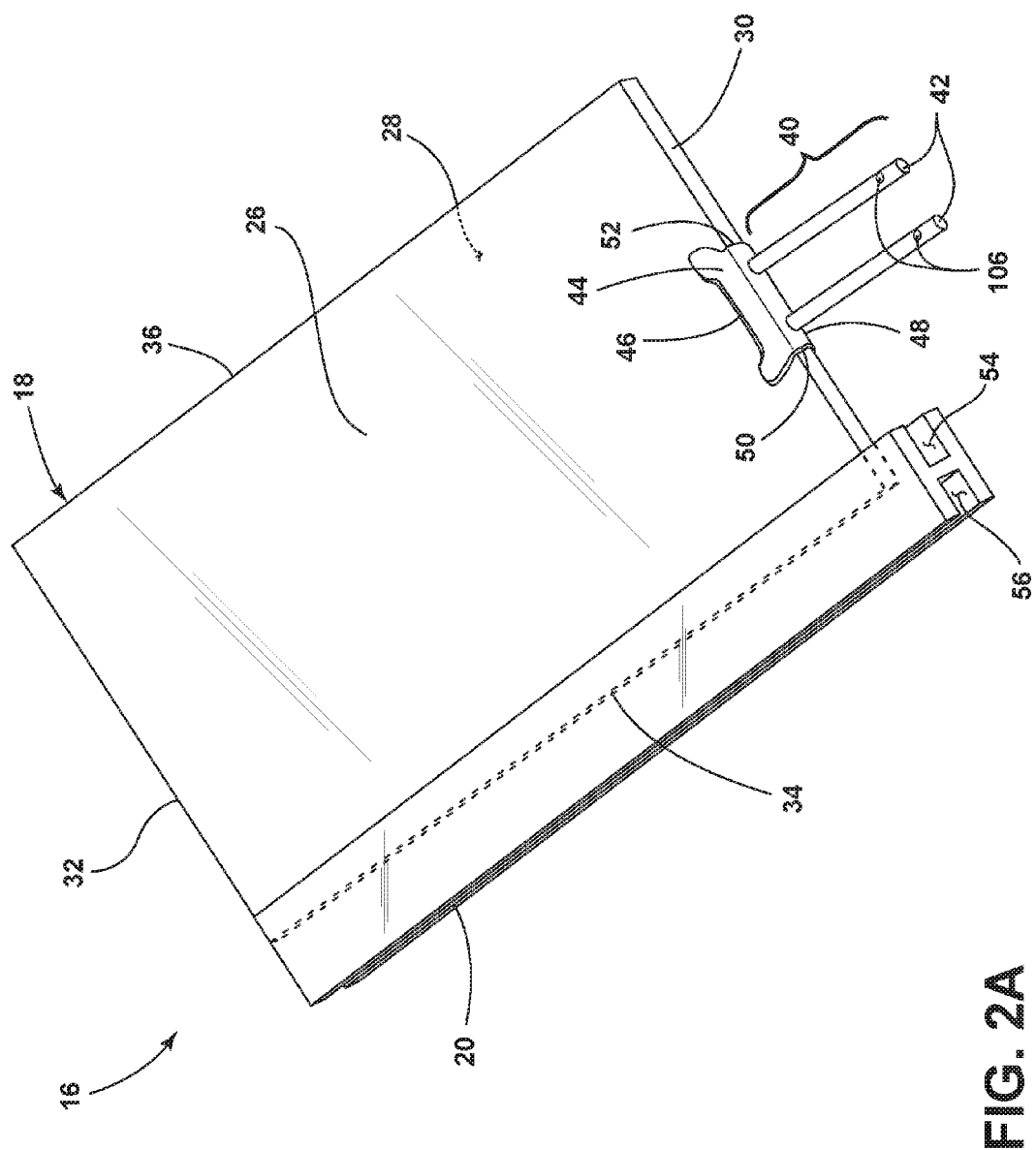
FIG. 2A is a perspective view of an embodiment of the removable windowpane assembly of FIG. 1 including a door-attachment projection.
Figure 2B:
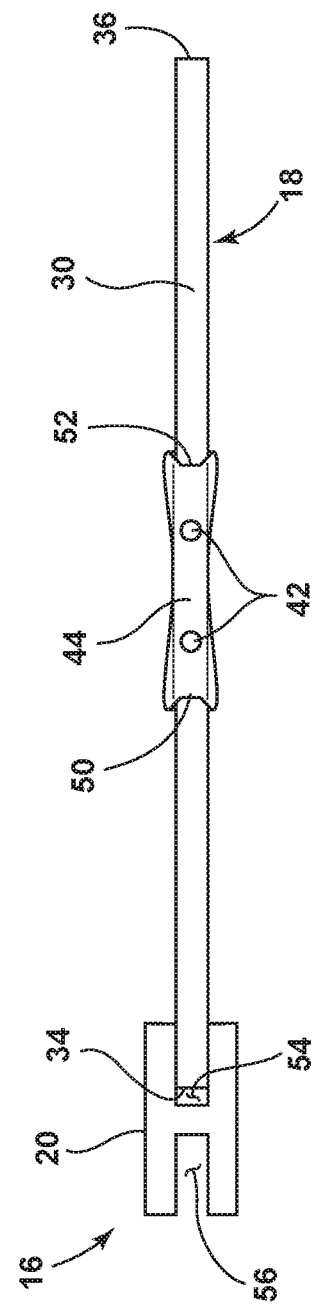
FIG. 2B is a bottom plan view of an embodiment of the removable windowpane assembly of FIG. 1 including a door-attachment projection.

Referring to FIGS. 2A and 2B, an embodiment of a removable windowpane assembly 16 of the present disclosure and of FIG. 1 is illustrated. The removable windowpane assembly 16 includes the unretractable windowpane 18 and a door-attachment projection 40 attached to the unretractable windowpane 18. The unretractable windowpane 18 is rigid and is made from tempered glass. The division bar 20 is attached to the unretractable windowpane 18. The unretractable windowpane 18 includes an outside facing surface 26 and an inside facing surface 28 opposite of the outside facing surface 26. The outside facing surface 26 is generally convex while the inside facing surface 28 is general concave, although both the outside facing surface 26 and inside facing surface 28 could be generally planar. The unretractable windowpane 18 contains at least three sides. The unretractable windowpane 18 illustrated has four sides: a bottom side 30, a top side 32, a divider side 34, and a fourth side 36. In this embodiment, the height of the unretractable windowpane 18 (height being the distance between the bottom side 30 and the top side 32) is more than eighty percent of the forward height 38 of the frameless passenger door 14 (see FIG. 3). The height of the unretractable windowpane 18 in other embodiments include heights in the range of 400 mm to 500 mm, including approximately 460 mm. The length (distance between the divider side 34 and the fourth side 36) of the unretractable windowpane 18 in some embodiments is in the range of 100 mm to 300 mm. The unretractable windowpane 18 is unretractable, meaning that the unretractable windowpane 18 cannot retract into the frameless passenger door 14 during normal operation.

A door-attachment projection 40 extends from the bottom side 30 of the unretractable windowpane 18. The door-attachment projection 40 is a male mating structure matching a female mating structure in the frameless passenger door 14 to releasably attach the removable windowpane assembly 16 to the frameless passenger door 14. In this embodiment, the door-attachment projection 40 takes the form of at least two arms 42. Alternatively, the door-attachment projection 40 can take the form of a rectangular body (not shown) that runs along length of the bottom side 30 of the unretractable windowpane 18. In the embodiment with the at least two arms 42, the at least two arms 42 are the same length, although in other embodiments the rear-most arm can be shorter than the other arms to allow space for other interior mechanisms of the frameless passenger door 14. The door-attachment projection 40 illustrated here includes a windowpane attachment portion 44 to connect the door-attachment projection 40 to the unretractable windowpane 18. The windowpane attachment portion 44 of this embodiment includes an exterior portion 46, an interior portion 48, and a bottom portion 50 forming a channel 52 partially surrounding the bottom side 30 of the unretractable windowpane 18. The windowpane attachment portion 44 is made from aluminum or steel. In this embodiment, the windowpane attachment portion forms a U-shaped channel. In another embodiment, illustrated in FIG. 2C, the windowpane attachment portion 44 can form an L-shaped bracket, using the bottom portion 50 and one of the interior portion 48 or the exterior portion 46, with the unretractable windowpane 18 affixed to the portion used. In such a circumstance, the portion used extends a substantial way up the unretractable windowpane 18 to provide sufficient structural support.

The division bar 20 is attached to the divider side 34 of the unretractable windowpane 18. The division bar 20 separates the unretractable windowpane 18 from the retractable windowpane 12 (see FIG. 1). The division bar 20 illustrated here forms an I-beam with a channel 54 partially surrounding the unretractable windowpane 18 and a channel 56 to partially surround the retractable windowpane 12 (see FIG. 3). The division bar 20 extends beyond the bottom side 30 of the unretractable windowpane 18. In this embodiment, the division bar 20 is parallel to the at least two arms 42 of the door-attachment projection 40. The division bar 20 is this embodiment is made from rubber. The division bar 20 can also be made of other materials or various combinations of materials including rubber, aluminum or other metals, and plastics.

Figure 3:
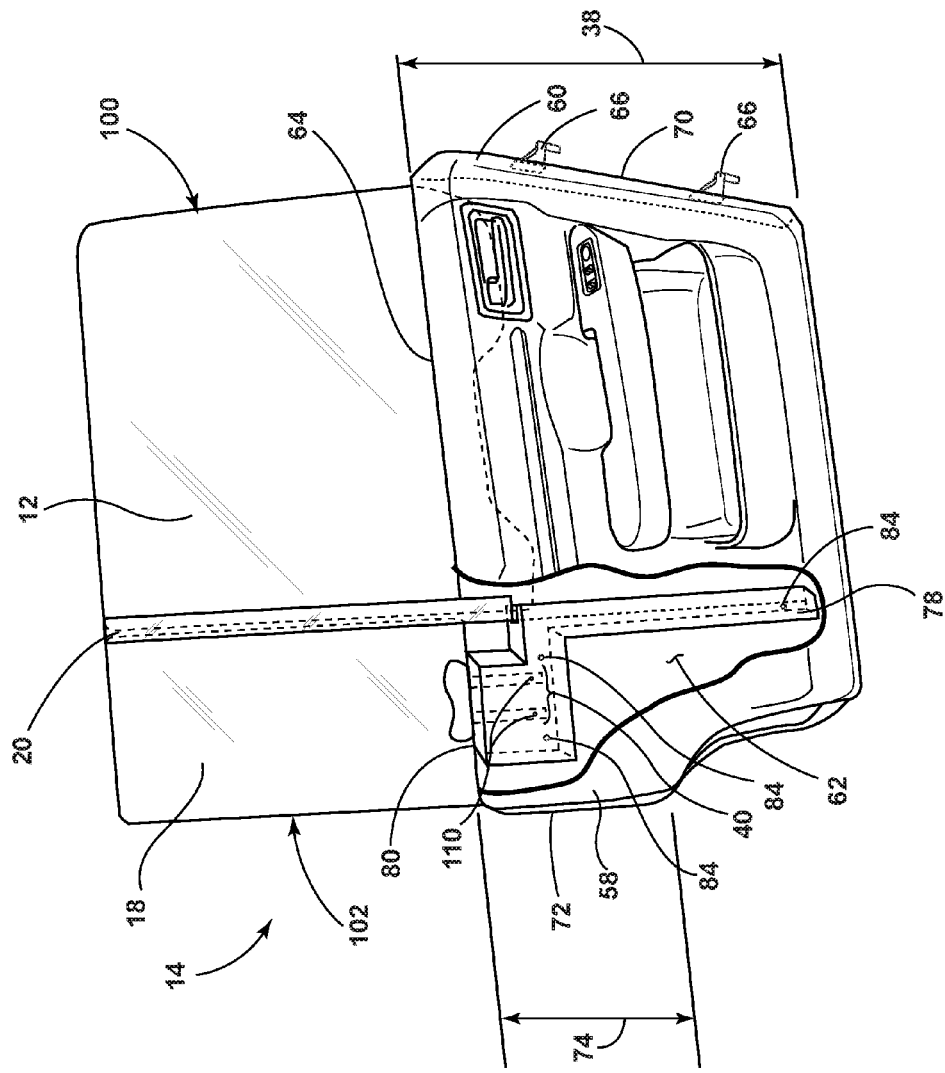
FIG. 3 is a perspective view of an embodiment of the frameless passenger door of FIG. 1 with a portion of the interior panel cut away to illustrate a receiver to receive the door-attachment projection.

Referring to FIG. 3, an embodiment of the frameless passenger door 14 for the vehicle 10 is illustrated. The frameless passenger door 14 includes an exterior panel 58 and an interior panel 60 forming a chamber 62 between the exterior panel 58 and the interior panel 60. The exterior panel 58 and interior panel 60 additionally define a beltline 64. The frameless passenger door 14 includes a pair of male hinges 66 matching a pair of female hinge receivers 68 on the door support 22 (see FIG. 1). The female hinge receivers 68 receive the male hinges 66 allowing the pair of male hinges 66 to releasably attach to the female hinge receivers 68. This allows for the attachment and detachment of the frameless passenger door 14 from the vehicle 10.

The frameless passenger door 14 further includes a forward end 70 and a rear end 72. The forward end 70 has a forward height 38. The rear end 72 has a rear height 74. In the embodiment illustrated in FIGS. 1 and 3, the forward height 38 is greater than the rear height 74. The rear height 74 is shorter than the forward height 38 to provide room for a rear wheel 76 (see FIG. 1). Because the rear height 74 of the frameless passenger door 14 is less than the height of the unretractable windowpane 18, the unretractable windowpane 18, even if it were retractable, could not be fully retracted down into the chamber 62 of the frameless passenger door 14. The frameless passenger door 14 further includes a receiver 78 located within the chamber 62. The receiver 78 has a top surface 80 that is adjacent to the beltline 64. The receiver 78 is located closer to rear end 72 than the forward end 70 of the frameless passenger door 14. The receiver 78 provides the female mating structure to receive the door-attachment projection 40 attached to the unretractable windowpane 18 and thus secure the removable windowpane assembly 16 to the frameless passenger door 14. The receiver 78 can include an adjustment mechanism, such as attachment apertures 82 (see FIG. 4A) to receive a jack screw 84, which allow the positioning of the receiver 78 to be adjusted.

Referring to FIGS. 4A and 4B, an embodiment of the receiver 78 includes at least two holes 86 as the female mating structure. It should be understood that the receiver 78 need not include at least two holes 86 but could include any female mating structure that can mate with the male mating structure of the door-attachment projection 40 of the removable windowpane assembly 16. The at least two holes 86 are disposed perpendicular to the beltline 64. The receiver 78 includes a horizontal portion 88 and a vertical portion 90. The vertical portion 90 is perpendicular to and longer than the horizontal portion 88. The vertical portion 90 and the horizontal portion 88 form a general L shape to provide room for a door handle mechanism and associated electronics (not shown) disposed within the chamber 62. The at least two holes 86 are located within the horizontal portion 88 and are parallel to the vertical portion 90. The receiver 78 can take any shape but preferably has a height 92 that is greater than the rear height 74 of the frameless passenger door 14. In this embodiment, the height 92 of the receiver 78 is just less than the forward height 38 of the frameless passenger door 14. However, the height 92 of the receiver 78 could be significantly less. The receiver 78 further includes a forward facing surface 94. A channel 96 is disposed within the forward facing surface 94 to receive and partially surround the retractable windowpane 12. The receiver 78 can be formed from plastic or a metal such as steel.

Figure 5:
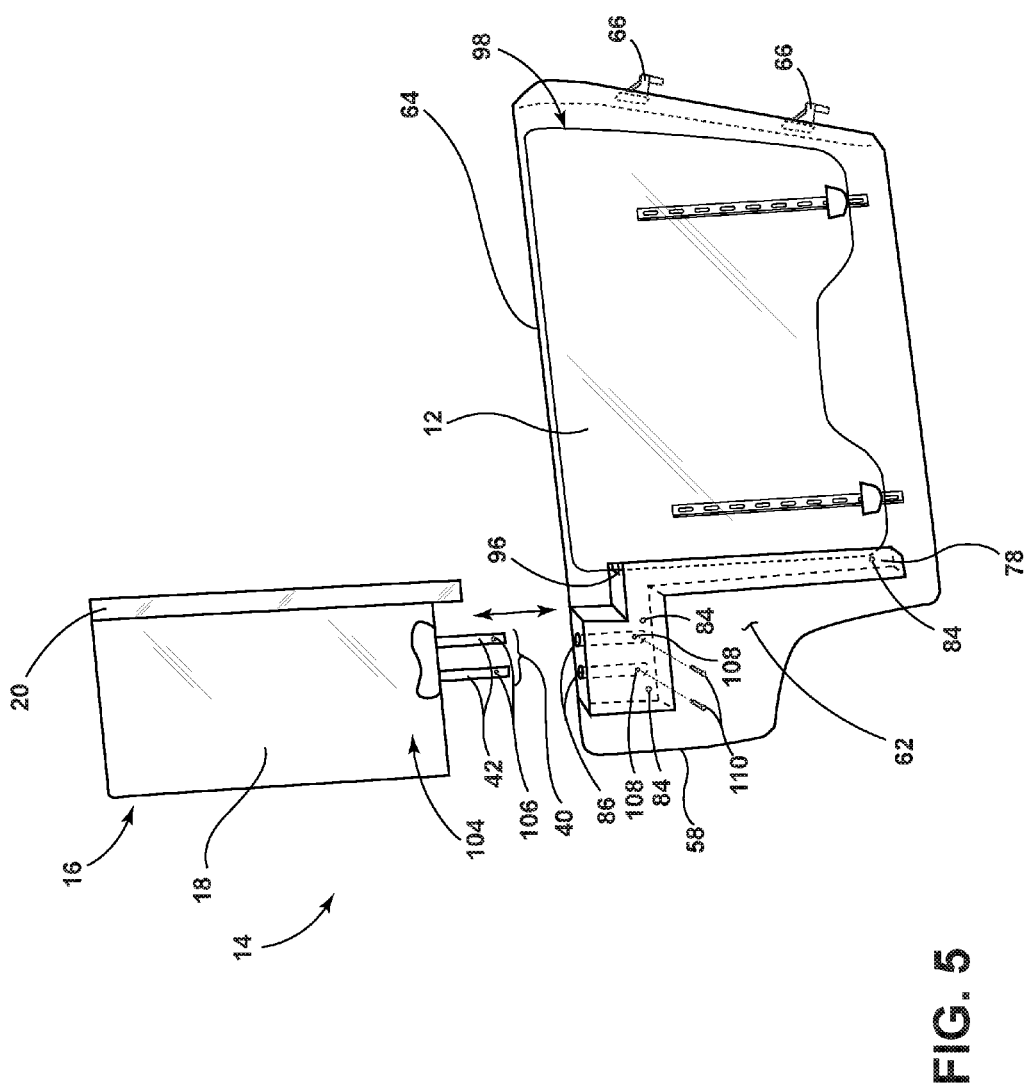
FIG. 5 is a perspective view of an embodiment of the frameless passenger door of FIGS. 1 and 3 illustrating the removable windowpane assembly of FIG. 1 in a detached position.

Referring to FIG. 5, an embodiment of the frameless passenger door 14 is illustrated with the interior panel 60 removed so that the chamber 62 and contents within the chamber 62 can be viewed. The retractable windowpane 12 is larger than the unretractable windowpane 18. The retractable windowpane 12 is movable between a down position 98 where the retractable windowpane 12 is completely housed in the chamber 62 below the beltline 64 and an up position 100 (see FIG. 3) where the retractable windowpane 12 is partially housed in the chamber 62 and partially extending above the beltline 64. When the retractable windowpane 12 is in the down position 98, the channel 96 of the receiver 78 partially surrounds the retractable windowpane 12. When the retractable windowpane 12 moves between the up position 100 and the down position 98, the retractable windowpane 12 slides within the channel 96 of the receiver 78. Thus, the channel 96 of the receiver 78 and the channel 56 of the division bar 20 form a continuous or nearly continuous channel for the retractable windowpane 12 to move within.

The removable windowpane assembly 16 has an attached position 102 (see FIG. 3) and a detached position 104. In the attached position 102, the receiver 78 has received the door-attachment projection 40 and is attached thereto. The receiver 78 can include a push button release mechanism to allow the release of the door-attachment projection 40. The door-attachment projection 40 can include apertures 106 that match apertures 108 (see FIG. 4A) within the receiver 78 to receive thread fasteners 110 while in the attached position 102. In the detached position 104, the receiver 78 is not receiving the door-attachment projection 40 and is not attached thereto. When the door-attachment projection 40 comprises of at least two arms 42 and the receiver 78 comprises at least two holes 86, and the unretractable windowpane 18 is in the attached position 102 (see FIG. 3), the at least two arms 42 are disposed in the at least two holes 86. In contrast, when the removable windowpane assembly 16 is in the detached position 104, the at least two arms 42 are not disposed in the at least two holes 86.

When the retractable windowpane 12 is in the up position 100 and the removable windowpane assembly 16 is in the attached position 102 (see FIG. 3), the division bar 20 is disposed between the unretractable windowpane 18 and the retractable windowpane 12. When the retractable windowpane 12 moves between the down position 98 and the up position 100, the retractable windowpane 12 moves within the channel 96 of the receiver 78 and the channel 56 of the division bar 20. In other words, the channel 96 of the receiver 78 and the channel 56 of the division bar 20 partially surround a portion of the retractable windowpane 12, when the retractable windowpane 12 moves between the down position 98 and the up position 100. When the unretractable windowpane 18 is in the attached position 102, a portion of the division bar 20 is in the chamber 62 of the frameless passenger door 14 (see FIG. 3).

Figure 6:
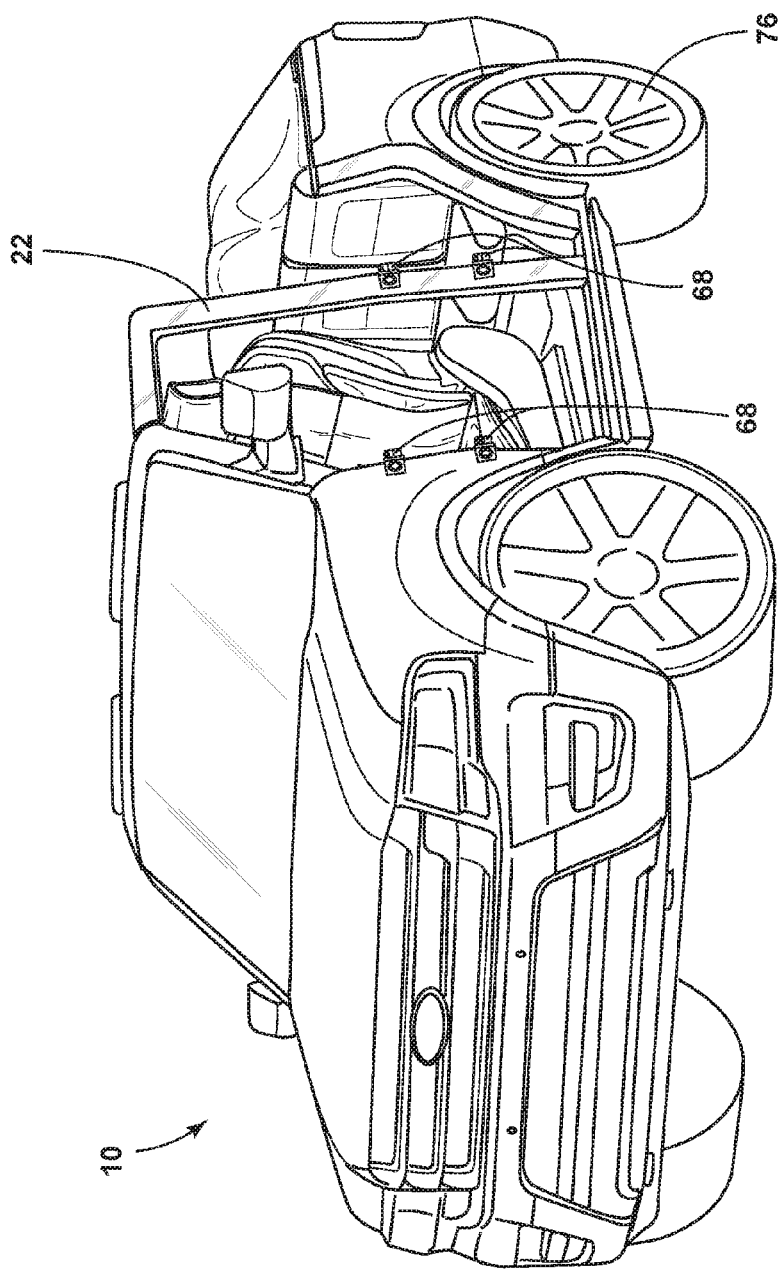
FIG. 6 is a perspective view of the vehicle of FIG. 1 with the convertible roof removed and the frameless passenger door removed.

In use, the operator of the vehicle 10 may desire to remove the convertible roof 24 and remove the frameless passenger door 14 from the vehicle 10. In such a circumstance, the operator removes the convertible roof 24. The operator opens the frameless passenger door 14. The operator moves the retractable windowpane 12 to the down position 98. The operator removes the removable windowpane assembly 16 from the frameless passenger door 14 by causing the removable windowpane assembly 16 to move from the attached positon 102 to the detached position 104. The operator then removes the frameless passenger door 14 (which is no longer attached to the removable windowpane assembly 16 and has the retractable windowpane 12 protected within the chamber 62) from the vehicle 10 by detaching the frameless passenger door 14 from the door support 22. The operator has thus transformed the vehicle 10 illustrated in FIG. 1 to the state of the vehicle 10 illustrated in FIG. 6, where the convertible roof 24, the frameless passenger door 14, and all other passenger doors have been removed. Note that both of the rear passenger doors of the vehicle 10 of FIGS. 1 and 6 are a frameless passenger door 14. In addition, it should be understood that any front passenger door can be a frameless passenger door 14 of the present disclosure.

Because the retractable windowpane 12 is in the down position 98, the retractable windowpane 12 is protected in the chamber 62 of the frameless passenger door 14 and is much less susceptible to breakage when the operator removes the frameless passenger door 14 from the vehicle 10 and transports the frameless passenger door 14 away from the vehicle 10. In addition, if the removable windowpane assembly 16 was incapable of moving to the detached position 104 (that is, if the removable window pane assembly 16 was permanently fixed to the frameless passenger door 14), the unretractable windowpane 18 would be more susceptible to receive damage when the operator removed the frameless passenger door 14 from the vehicle 10 and transported the frameless passenger door 14. By detaching the removable windowpane assembly 16 from the frameless passenger door 14, the operator can transport the removable windowpane assembly 16 away from the vehicle 10 without damaging the unretractable windowpane 18. Moreover, by detaching the removable windowpane assembly 16 from the frameless passenger door 14 before removing the frameless passenger door 14 from the vehicle 10, the frameless passenger door 14 weighs less and is less cumbersome for the operator to remove from the vehicle 10 and transport away.

Further, detaching the removable windowpane assembly 16 from the frameless passenger door 14 allows for no passenger door windowpanes to be present above the beltline 64 when the operator has removed the convertible roof 24 from the vehicle 10. Having no passenger door windowpanes above the beltline 64 improves the open-air feeling of having the convertible roof 24 removed from the vehicle. If the removable windowpane assembly 16 (including the unretractable windowpane 18) was not detachable from the frameless passenger door 14, removing the convertible roof 24 would provide less of an open-air feeling.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A removable windowpane assembly for a vehicle comprising:
   an unretractable windowpane including a divider side and a bottom side;
   a division bar attached to the divider side of the unretractable windowpane; and
   a door-attachment projection attached to the unretractable windowpane;
   wherein, the division bar forms an I-beam with a first channel partially surrounding the unretractable windowpane and a second channel configured to partially surround a retractable windowpane and allow the retractable windowpane to move within, and
   wherein the division bar extends beyond the bottom side of the unretractable windowpane.

2. The removable windowpane assembly of claim 1, wherein the door-attachment projection extends from the bottom side.

3. The removable windowpane assembly of claim 2, the door-attachment projection comprising at least two arms.

4. The removable windowpane assembly of claim 1, the door-attachment projection comprising at least two arms extending from the bottom side, wherein the division bar is parallel to the at least two arms.

5. A passenger door for a vehicle comprising:
   an exterior panel and an interior panel forming a chamber and defining a beltline;
   a retractable windowpane disposed within the chamber; and
   a receiver located within the chamber, the receiver comprising:
      a top surface adjacent to the beltline configured to receive a door-attachment projection attached to an unretractable windowpane; and
      a forward facing surface and a channel disposed within the forward facing surface partially surrounding the retractable windowpane.

6. The passenger door of claim 5 further comprising:
   a forward end; and
   a rear end configured to be located rearward of the forward end when the passenger door is attached to a vehicle;
   the forward end having a forward height and the rear end having a rear height;
   wherein the forward height is greater than the rear height, and the receiver is located closer to the rear end than the forward end.

7. The passenger door of claim 5, the receiver comprising at least two holes disposed perpendicular to the beltline.

8. The passenger door of claim 5, the receiver comprising:
   a horizontal portion and a vertical portion, the vertical portion being perpendicular to and longer than the horizontal portion; and
   at least two holes disposed within the horizontal portion and parallel to the vertical portion.

9. A vehicle comprising:
   a removable windowpane assembly comprising an unretractable windowpane and a door-attachment projection attached to the unretractable windowpane;
   a passenger door comprising: an exterior panel and an interior panel forming a chamber and defining a beltline; and a receiver located within the chamber with a top surface adjacent the beltline to receive the door-attachment projection attached to the unretractable windowpane;
   a retractable windowpane that is larger than the unretractable windowpane;

the retractable windowpane movable between a down position where the retractable windowpane is completely housed in the chamber below the beltline and an up position where the retractable windowpane is partially housed in the chamber and partially extending above the beltline; and the removable windowpane assembly having an attached position and a detached position, wherein in the attached position the receiver has received the door-attachment projection and is attached thereto, and wherein in the detached position the receiver is not receiving the door-attachment projection and is not attached thereto, wherein the receiver further comprises a forward facing surface and a channel disposed within the forward facing surface; and wherein when the retractable windowpane is in the down position, the channel of the receiver partially surrounds the retractable windowpane.

10. The vehicle of claim 9, the removable windowpane assembly further comprising a division bar attached to the unretractable windowpane;

wherein when the retractable windowpane is in the up position and the removable windowpane assembly is in the attached position, the division bar is disposed between the unretractable windowpane and the retractable windowpane; and wherein when the removable windowpane assembly is in the attached position, a portion of the division bar is in the chamber.

11. The vehicle of claim 9, wherein when the retractable windowpane moves between the up position and the down position, the retractable windowpane moves within the channel of the receiver.

12. The vehicle of claim 9, the door-attachment projection comprising at least two arms, the receiver comprising at least two holes, wherein when the removable windowpane assembly is in the attached position, the at least two arms are disposed in the at least two holes, and wherein when the removable windowpane assembly is in the detached position, the at least two arms are not disposed in the at least two holes.

13. The vehicle of claim 12, the at least two arms are parallel to a division bar attached to the unretractable windowpane and the at least two holes are perpendicular to the beltline.

14. The vehicle of claim 9, the passenger door further comprising a forward end and a rear end, the forward end having a forward height and the rear end having a rear height, wherein the forward height is greater than the rear height, and the receiver is located closer to the rear end than the forward end.

15. The vehicle of claim 9, the door-attachment projection comprising at least two arms parallel to a division bar attached to the unretractable windowpane;

the receiver comprising:
 a horizontal portion and a vertical portion, which is perpendicular to and longer than the horizontal portion; and
 at least two holes disposed within the horizontal portion and parallel to the vertical portion;

wherein when the removable windowpane assembly is in the attached position, the at least two arms are disposed in the at least two holes, and wherein when the removable windowpane assembly is in the detached position, the at least two arms are not disposed in the at least two holes.

16. The vehicle of claim 9 further comprising a convertible roof and a door support, wherein the passenger door is releasably attached to the door support.

* * * * *